United States Patent [19]

Rantala

[11] 4,180,957

[45] Jan. 1, 1980

[54] MOLDING CLIP

[75] Inventor: Charles W. Rantala, Warren, Mich.

[73] Assignee: General Motors Corporation, Detroit, Mich.

[21] Appl. No.: 953,219

[22] Filed: Oct. 20, 1978

[51] Int. Cl.² .............................................. E04C 2/38
[52] U.S. Cl. ................................... 52/718; 24/73 FT
[58] Field of Search ................. 403/405, 406; 52/718; 49/36, 463; 248/27.3; 24/73 FT, 73 PC, 85 B

[56] References Cited

U.S. PATENT DOCUMENTS

| 2,148,847 | 2/1939 | Wiley | 52/718 X |
| 2,216,219 | 10/1940 | Wiley | 52/718 X |
| 2,685,473 | 8/1954 | Adell | 24/73 FT |
| 2,918,712 | 12/1959 | Fernberg | 24/73 FT |
| 2,981,387 | 4/1961 | Dutchik | 24/73 FT |
| 3,008,550 | 11/1961 | Miles et al. | 52/718 X |
| 3,977,048 | 8/1975 | Benedetti | 24/73 FT |

FOREIGN PATENT DOCUMENTS

| 816177 | 7/1959 | United Kingdom | 24/73 FT |
| 830143 | 3/1960 | United Kingdom | 24/73 FT |

*Primary Examiner*—Wayne L. Shedd
*Attorney, Agent, or Firm*—R. L. Phillips

[57] ABSTRACT

A molding clip having a clamping portion with barbs for gripping and anchoring to a panel and having a molding retaining portion with barbs for anchoring a molding wherein the retaining portion is adapted to be deflected to a large degree by the molding to establish anchoring thereof in one application and to a much lesser degree to establish the anchoring in another application of the same molding.

2 Claims, 7 Drawing Figures

MOLDING CLIP

This invention relates to a molding clip and more particularly to a molding clip that is adapted to retain an edge molding in a motor vehicle wherein the fit of the molding varies.

With known prior molding clips of the type having anchoring fit with the molding, the interference fit cannot vary substantially without losing retention. As a result, it is normal practice to provide a certain size of clip for each different mold fitting or else provide different moldings to retain a certain fit with a single size clip. For example, the molding clips for retaining a molding that trims the periphery of an opening in the roof of a motor vehicle is not normally adaptable in a single size to retain the molding where the latter has retention legs which fit over the clip and also over a headliner laminate that may have two or more different thicknesses. Normally, this problem would be solved by providing either two different moldings or using one molding and two different size clips. In either case, there results substantial additional costs and there is the attendant difficulty of segregating slightly different parts (clips or moldings).

The molding clip according to the present invention eliminates the need for part proliferation by being adaptable to anchor a single molding to fit over either thick or thin headliner material or the like wherein the fit of the molding with the retention portion of the clip changes with the application. This is accomplished by the molding clip having a clamping portion with sharp points for gripping and anchoring to a panel adjacent its edge and having a molding retaining portion extending therefrom with sharp points for anchoring a molding wherein the retaining portion is adapted to be deflected to a substantial degree by the molding to establish anchoring thereof in one application and does not require such deflection to establish the anchoring in another application of the same molding. In the case of retaining a molding over the edge of a motor vehicle panel and a headliner having two different thicknesses, a single clip according to the present invention is provided with a retaining portion that is sized so as to be deflected to a substantial degree by the molding to establish anchoring thereof when the headliner is thick and is deflected to a much lesser degree to establish anchoring when the molding is applied in an application where the headliner is thin.

An object of the present invention is to provide a new and improved molding clip of the type having an anchoring fit with a molding.

Another object is to provide a molding clip having an anchoring fit with the molding which can vary to a substantial degree.

Another object is to provide a molding clip having a clamping portion for anchoring to a panel adjacent its edge and a depending molding retaining portion for anchoring a molding wherein the retaining portion is adapted to be deflected to a substantial degree by the molding to establish anchoring thereof in one application and does not require such deflection to establish the anchoring in another application of the same molding.

These and other objects of the present invention will be more apparent from the following description and drawing in which.

Figure 1:
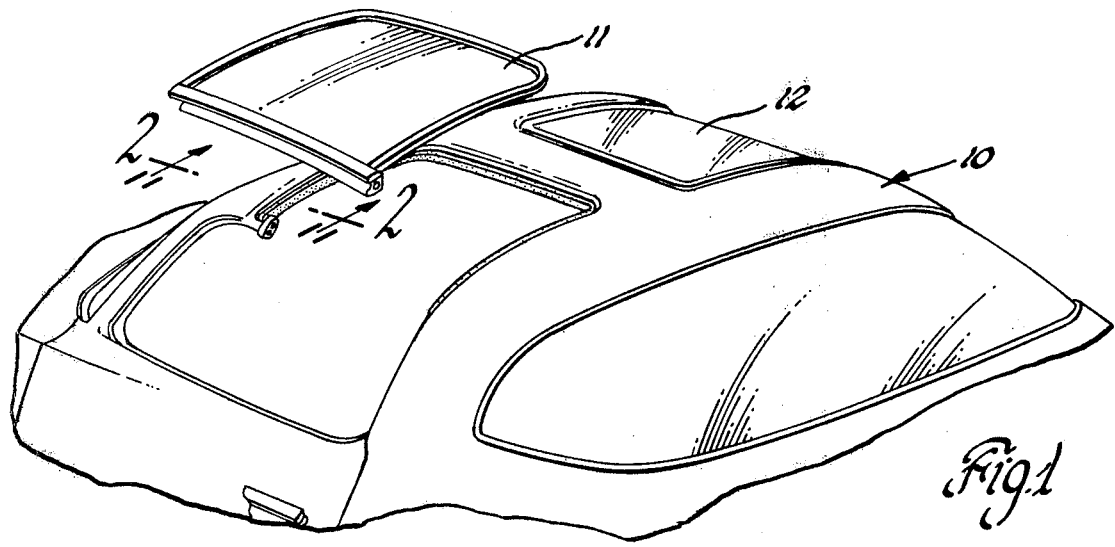
FIG. 1 is a partial three-dimensional view of a motor vehicle having molding clips retaining an interior trim molding relative to a headliner in accordance with the present invention.
Figure 2:
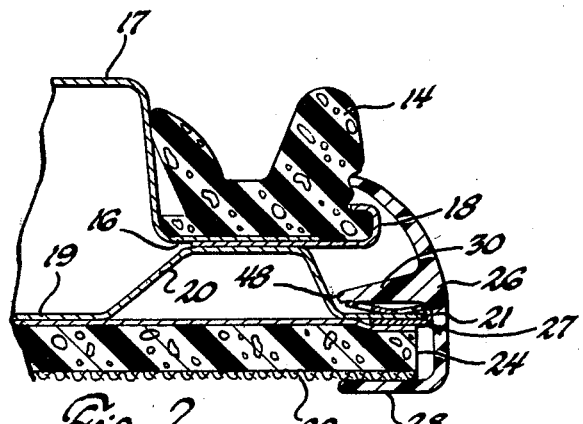
FIG. 2 is an enlarged view taken along the line 2—2 in FIG. 1 wherein the headliner is of large thickness.
Figure 3:
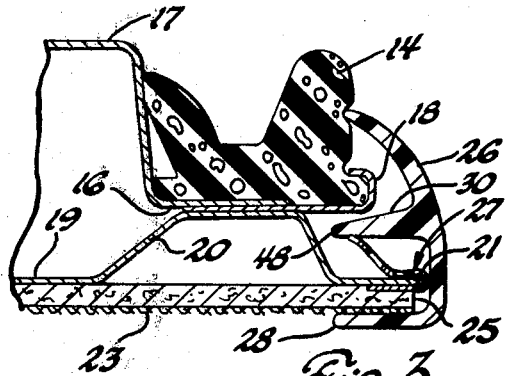
FIG. 3 is a view similar to FIG. 2 but wherein the headliner is of small thickness.
Figure 4:
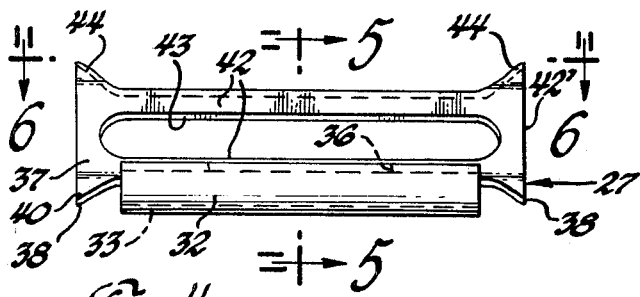
FIG. 4 is an enlarged view of the molding clip in FIGS. 2 and 3 looking in the direction of the arrows and prior to its assembly.

Referring to FIGS. 1, 2 and 3, there is shown a motor vehicle body 10 having a pair of detachable roof panels 11 and 12 which when secured in place are sealed along three sides thereof by a weather strip 14. The weather strip 14 is bonded to the bottom of a body flange 16 which extends about the outer roof panel 17 and to a channel 18 which is welded to the underside of the body flange 16 and has a return bent edge capturing the outer edge of the weather strip 14. In addition, the vehicle body includes an inner roof panel 19 having a raised rib 20 which is welded to the underside of the channel 18. The inner panel 19 extends outwardly of the weather strip channel 18 and terminates with an edge 21 to define the skylight opening. The customer is provided with a selection of headliners fitting the ceiling of the interior and these may have either a large thickness as with the headliner 22 in FIG. 2 or a small thickness as with the headliner 23 in FIG. 3.

To trim the gap between the weather strip 14 and the exposed ceiling surface of either the thick headliner 22 with its thick edge 24 or the thin headliner 23 with its thin edge 25, there is employed the same interior trim or finishing molding 26 which is anchored in place by a plurality of molding clips 27 according to the present invention. As shown in FIGS. 2 and 3, the molding 26 has a pair of parallel legs 28 and 30 which are adapted to extend past the inner panel edge 21 and also the thick headliner edge 24 or thin headliner edge 25 and along the oppositely facing sides or surfaces of the juxtaposed inner body panel 19 and headliner 22 or 23 resulting in either a small space between the upper leg 30 and the outwardly or upwardly facing side of the inner body panel 19 as is the case in FIG. 2 or a large space at this same location as is the case in FIG. 3.

Figure 5:
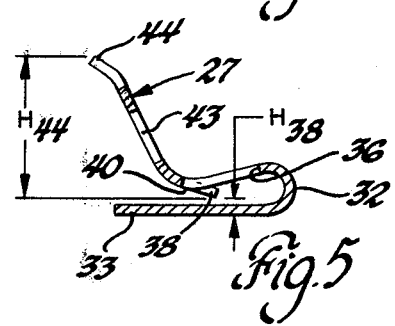
FIG. 5 is a view taken along the line 5—5 in FIG. 4.
Figure 6:
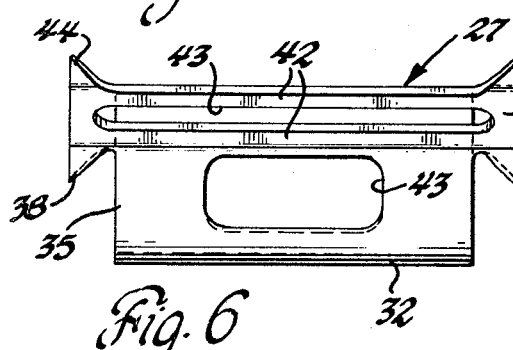
FIG. 6 is a view taken along the line 6—6 in FIG. 4.
Figure 7:
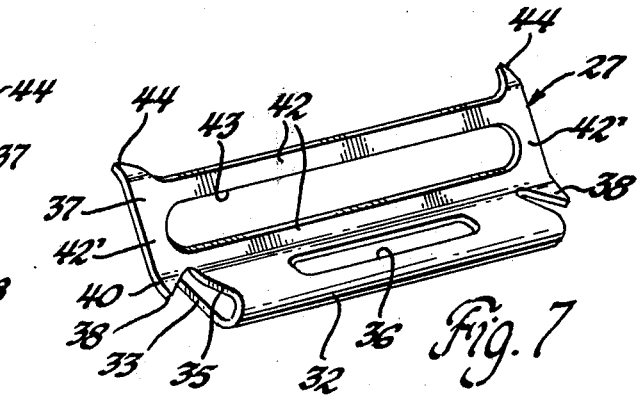
FIG. 7 is a three-dimensional view of the molding clip in FIGS. 4, 5 and 6.

The molding clip 27 is adapted to retain the same molding 26 regardless of whether the thick headliner 22 is used in FIG. 2 or the thin headliner 23 is used in FIG. 3 or any other headliner having a thickness intermediate that of the headliners shown. The retaining clip 27 is a generally U-shaped strip formed of a resilient or spring material preferably spring steel and as best shown in FIGS. 4 through 7 and comprises a reverse bent portion 32 providing a pair of arms 33 and 35 which extend generally parallel to each other and are adapted to extend past the edge 21 and along the outwardly and inwardly facing sides or surfaces of the inner roof panel 19. The arm 35 on the outwardly facing side of the inner roof panel 19 has a transverse slot 36 which lightens the clip and a widened portion 37 having a depending sharp barb or anchor 38 at two corners thereof which depend therefrom in the direction of both the reverse bend and the other arm 33. The tips of the barbs 38 are normally spaced a predetermined distance $H_{38}$ from the other arm less than the thickness of the panel 19 which they are to engage. In addition, the arm 35 has a straight ramp portion 40 which extends to the barbs 38 as best shown in FIG. 5 and is adapted to engage the edge 21 of the panel and thereby effect deflection of the arm 35 so that the clip arms are forceable to grippingly straddle the panel while the barbs are urged into anchoring engagement with the outwardly facing side thereof.

The molding clip further includes a deflectable extension 42 extending as an extension of the widened portion 37 from the arm 35 and outward toward the molding leg 30. The extension 42 is provided with a substantial degree of deflectability by a transverse slot 43 which extends substantially the width thereof leaving only narrow connecting links 42' and the extension is anchorable to the molding by being provided at the two corners of its terminal end with a barb or anchor 44 which extends away from the reverse bend and the other arm 33. As shown in FIG. 5, the tips of the molding anchoring barbs 44 are spaced a predetermined distance $H_{44}$ from the tips of the panel anchoring barbs 38 greater than the largest space between the one molding leg 30 and the outwardly facing side of the inner roof panel 19. In addition, the extension 42 along its links 42' and on opposite sides of its slot 43 provides a straight ramp portion extending to the barbs 44 which is adapted to be engaged by the end 48 of the molding leg 30 to thereby deflect the extension. As a result, the molding legs 28 and 30 are forceable to straddle the deflectable clip extension 42 and the roof panel 19 and either the thick headliner 23 or thin headliner 23 while the barbs 44 are urgeable into anchoring engagement with the one molding leg 30 whether there exists a large or small space respectively between the one molding leg and the outwardly facing side of the roof panel.

Furthermore, it will be understood that while the molding clip is shown as being adapted to accommodate two headliners or parts of varying thickness juxtaposed with a second part such as the roof panel which is of a given uniform thickness, the molding clip is also adaptable to accommodate other thicknesses and numbers of parts which are straddleable by the molding legs. In each case, the extension portion of the clip will deflect to accommodate differences in thickness of the part or parts being secured to the part gripped by the clip.

The above described embodiment is illustrative of the invention which may be modified within the scope of the appended claims.

The embodiments of the invention in which an exclusive property or privilege is claimed are defined as follows:

1. A molding clip adapted to secure a molding over adjacent edges of a plurality of juxtaposed parts wherein the molding has legs which extend past the edges and along the oppositely outwardly facing sides of the juxtaposed parts and wherein there exists a space between one of the molding legs and the outwardly facing side of one of the parts that changes substantially with a substantial change in the thickness of the parts, said clip comprising a pair of arms adapted to extend past the edge and along the outwardly and inwardly facing sides of the one part, the one arm on the outwardly facing side having first anchor means adapted to be normally spaced a predetermined distance from the other arm less than the thickness of the one part, said one arm further having a ramp portion extending to said first anchor means adapted to engage the edge of the one part and thereby effect deflection of said one arm whereby said arms are forceable to grippingly straddle the one part while said first anchor means is urged into anchoring engagement with the outwardly facing side of the one part, an extension integral with and adapted to extend from said one arm toward the one molding leg, said extension having second anchor means adapted to be spaced a predetermined distance from said first anchor means greater than the largest space between the one molding leg and the outwardly facing side of the one part, said extension including a ramp portion extending to said second anchor means adapted to be engaged by the end of the one molding leg and thereby effect deflection of said extension whereby the molding legs are forceable to straddle said extension and the juxtaposed parts while said second anchor means is urged into anchoring engagement with the one molding leg regardless of whether the space between the one molding leg and the outwardly facing side of the one part is changed substantially.

2. A molding clip adapted to secure a molding over adjacent edges of a plurality of juxtaposed parts wherein the molding has legs which extend past the edges and along the oppositely outwardly facing sides of the juxtaposed parts and wherein there may exist either a large or small space between one of the molding legs and the outwardly facing side of one of the parts depending on the thickness of one of the parts, said clip comprising a reverse bent portion providing a pair of arms adapted to extend past the edge and along the outwardly and inwardly facing sides of the one part, the one arm on the outwardly facing side having integral first anchor means adapted to be normally spaced a predetermined distance from the other arm less than the thickness of the one part, said one arm further having a ramp portion extending to said first anchor means adapted to engage the edge of the one part and thereby effect deflection of said one arm whereby said arms are forceable to grippingly straddle the one part while said first anchor means is urged into anchoring engagement with the outwardly facing side of the one part, an extension integral with and adapted to extend from said one arm toward the one molding leg, said extension having integral second anchor means adapted to be spaced a predetermined distance from said first anchor means greater than the largest space between the one molding leg and the outwardly facing side of the one part, said extension including a ramp portion extending to said second anchor means adapted to be engaged by the end of the one molding leg and thereby effect deflection of said extension whereby the molding legs are forceable to straddle said extension and the juxtaposed parts while said second anchor means is urged into anchoring engagement with the one molding leg whether there exists the large or small space between the one molding leg and the outwardly facing side of the one part.

* * * * *

UNITED STATES PATENT AND TRADEMARK OFFICE
CERTIFICATE OF CORRECTION

PATENT NO. : 4,180,957
DATED : January 1, 1980
INVENTOR(S) : Charles W. Rantala

It is certified that error appears in the above-identified patent and that said Letters Patent are hereby corrected as shown below:

Column 4, line 19, "forceable" should read -- forcible --.

Column 4, line 55, "forceable" should read -- forcible --.

The sole sheet of drawing should be deleted to appear as per attached sheet of drawing.

Signed and Sealed this

Tenth Day of June 1980

[SEAL]

Attest:

SIDNEY A. DIAMOND

Attesting Officer

Commissioner of Patents and Trademarks